United States Patent [19]
Hampton

[11] Patent Number: 5,621,977
[45] Date of Patent: Apr. 22, 1997

[54] PLUMB BOB

[76] Inventor: Kenneth J. Hampton, 11731 Puryear La., Garden Grove, Calif. 92640

[21] Appl. No.: 512,069

[22] Filed: Aug. 7, 1995

[51] Int. Cl.⁶ ................................................. G01C 15/10
[52] U.S. Cl. ............................................. 33/392; 33/666
[58] Field of Search ............................. 33/392, 666, 413

[56] References Cited

U.S. PATENT DOCUMENTS

| | | | |
|---|---|---|---|
| 995,872 | 6/1911 | Joice | 33/392 |
| 1,025,828 | 5/1912 | Paul | 33/392 |
| 1,110,146 | 9/1914 | Rice | 33/392 |
| 2,592,425 | 4/1952 | Jackson | 33/392 |
| 2,795,053 | 6/1957 | Wohlstrom | 33/392 |
| 3,113,387 | 12/1963 | Bean, Jr. | 33/392 |
| 5,157,843 | 10/1992 | Barcewski | 33/392 |

FOREIGN PATENT DOCUMENTS

| | | | |
|---|---|---|---|
| 406122 | 1/1910 | France | 33/392 |
| 1455868 | 11/1976 | United Kingdom | 33/392 |

*Primary Examiner*—Christopher W. Fulton
*Attorney, Agent, or Firm*—Plante & Strauss

[57] ABSTRACT

There is disclosed a plumb bob having a segmented bob body with an upper bob body segment which is attached to a flexible suspension cord and a removably attached lower bob body segment. The upper segment of the bob body has a marker mechanism which can be an internally contained marker that is resiliently biased within the upper segment by springs which permit the marker to project from the under surface of the body upon impact, registering a point on the lower surface. An alternative marker mechanism comprises a pair of crossed slots in the lower end surface of the upper segment which guide a marker for scribing lines which intersect at the transfer point. The upper segment of the bob body is secured on the transfer point by a central protuberance which permits the body to tilt, but not topple, resting at the transfer point. A third embodiment which is useful in either of the first two embodiments comprises a removable stand attached to the plumb bob body which has a lower support member located on a plane through which the lower point of the plumb bob slightly projects, whereby the plumb bob can be rested on the transfer point in a slightly tilted orientation.

11 Claims, 3 Drawing Sheets

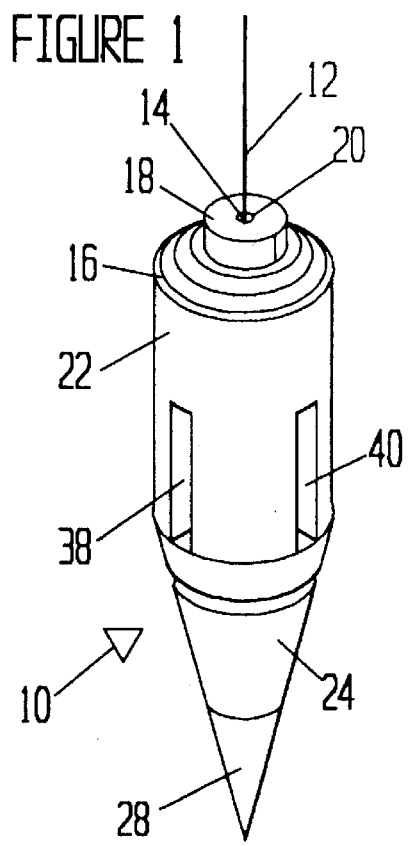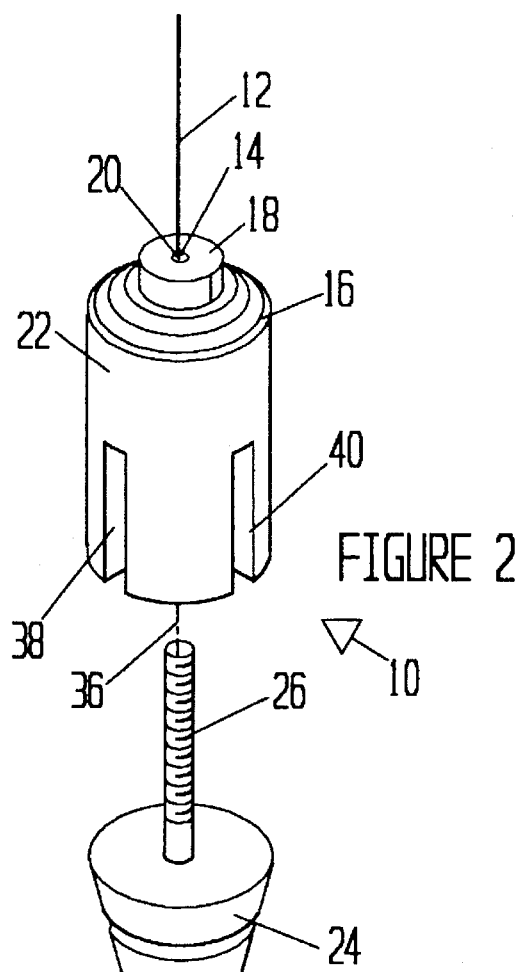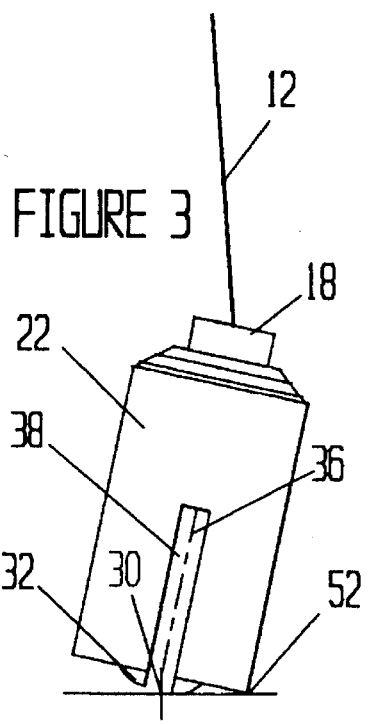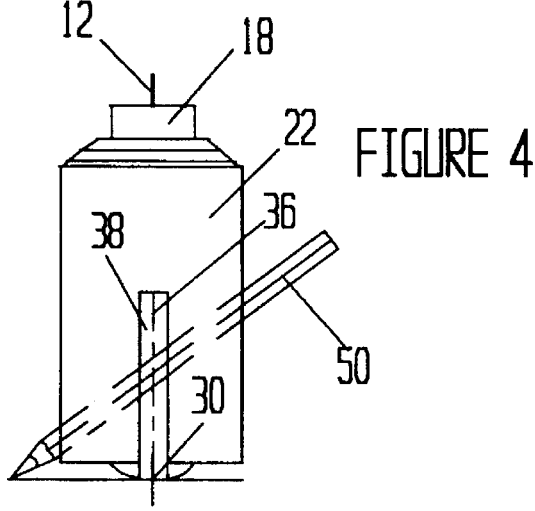

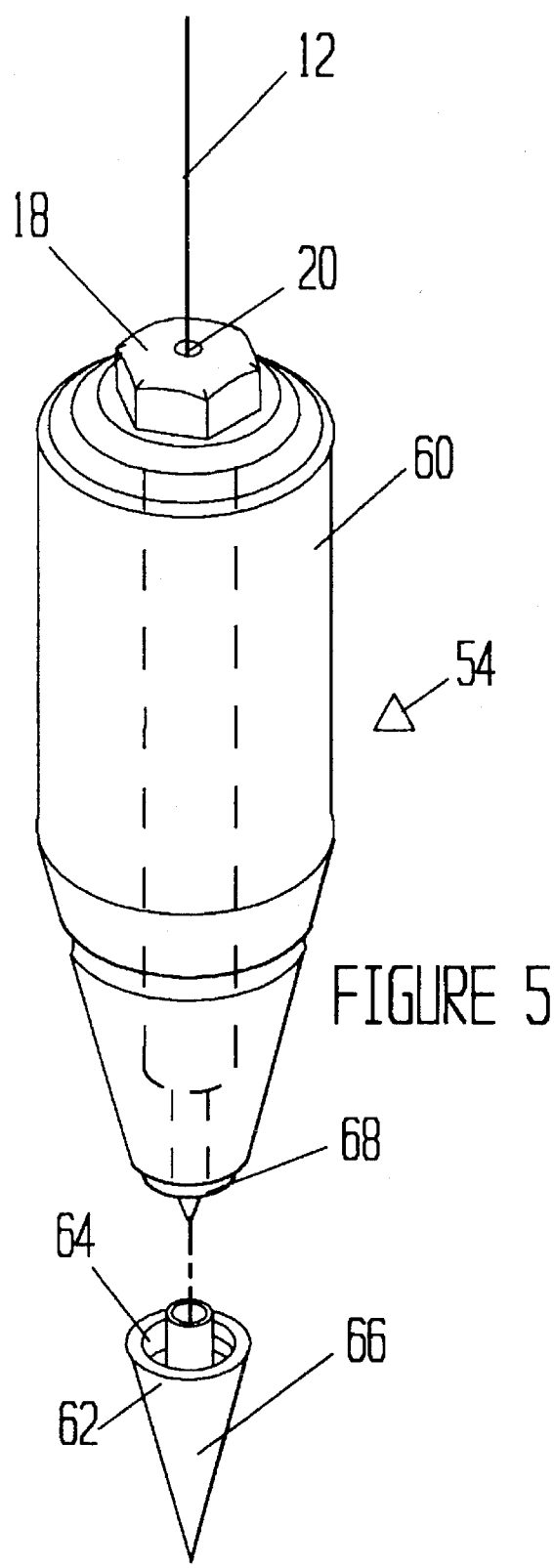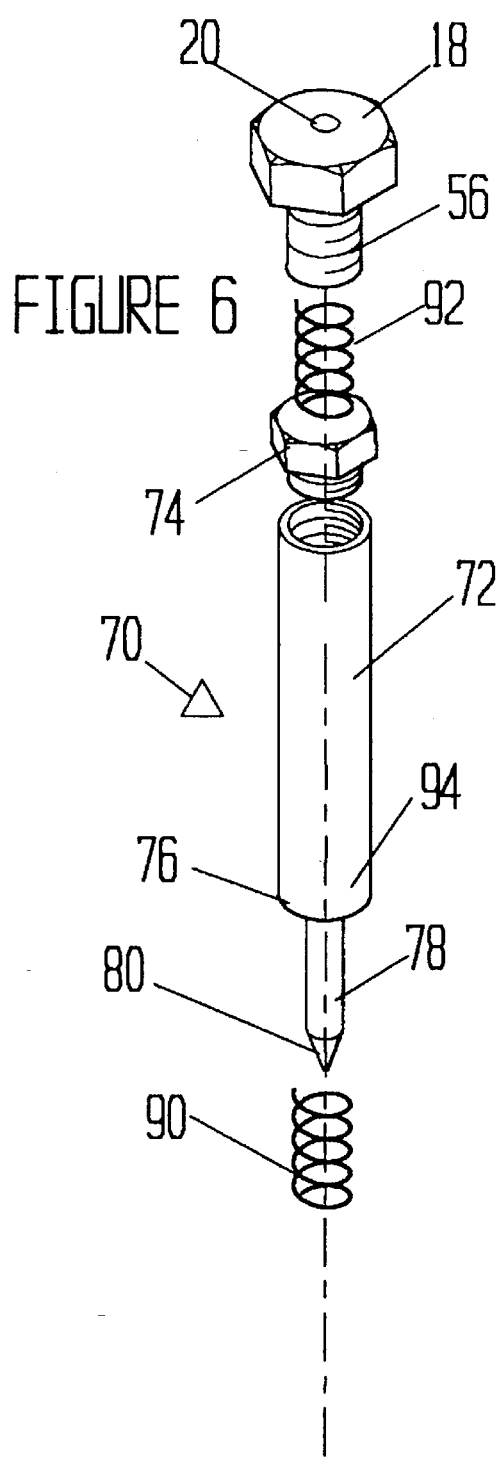

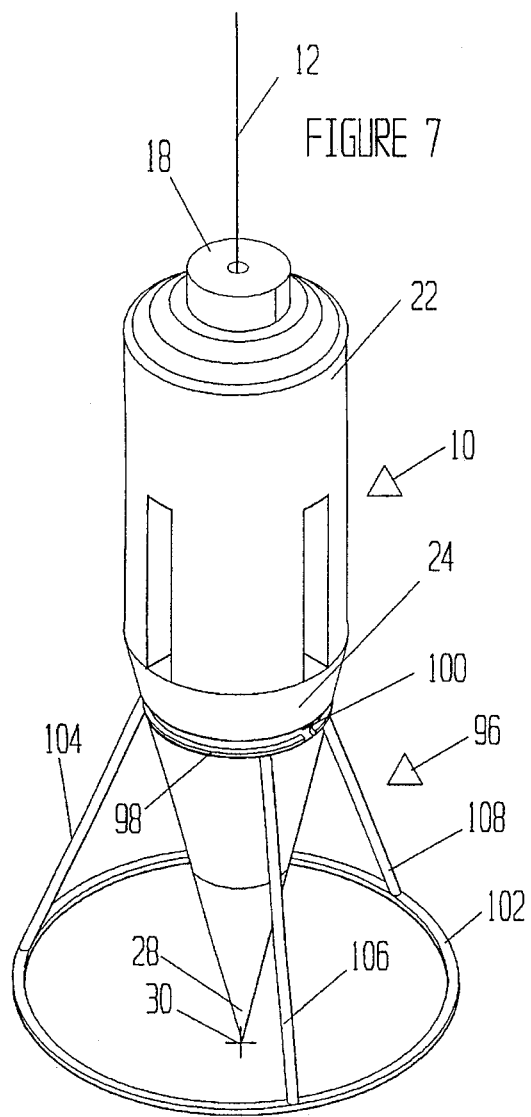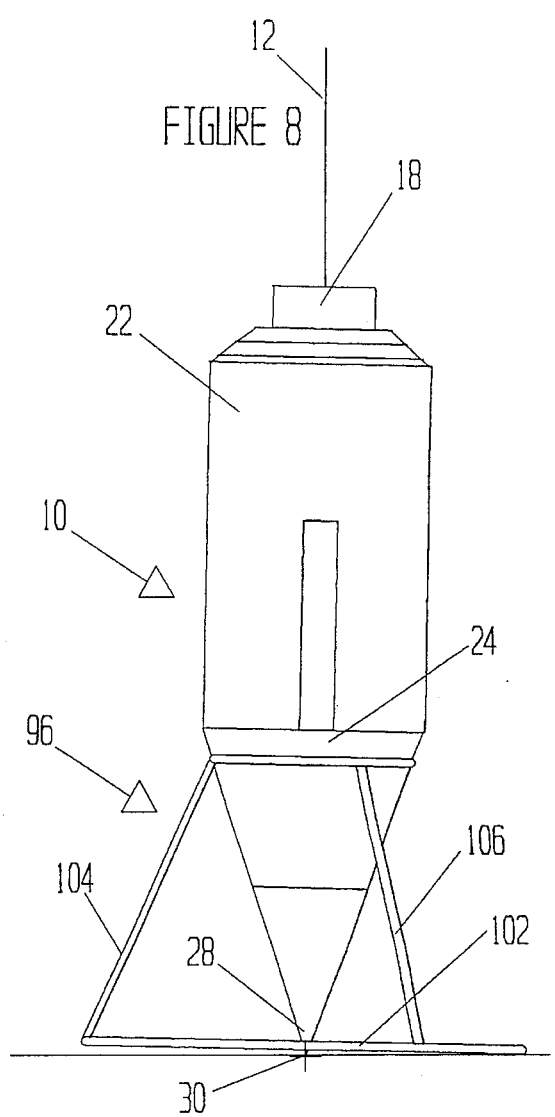

PLUMB BOB

BACKGROUND OF THE INVENTION

1. Field of the Invention

This invention relates to a plumb bob and, in particular, to a plumb bob useful by a single workman.

2. Brief Statement of the Prior Art

The time honored practice for accurately transferring the location of a point from an upper to a lower surface comprises suspending a weighted body having a pointed lower end with a flexible cord which is held or anchored to the point on the upper plane. While this practice has been used since ancient times without any significant changes other than cosmetic or manufacturing improvements. The practice requires two workers when the upper and lower planes are separated by a distance greater than the span of the worker's arms, or the necessity to anchor the cord of the device at the point on the upper surface. Either procedure is unnecessarily burdensome and there is the need for a plumb bob which can be used by a single worker to transfer the location of the point from a upper surface to a remote lower surface without the necessity to anchor the support cord to the upper surface.

OBJECTIVES OF THE INVENTION

It is an objective of this invention to provide a plumb bob useful by a single worker.

It is a further objective of this invention to provide a plumb bob having a segmented body with upper and lower bob body segments to permit its conversion from a conventional to a remotely functioning plumb bob.

It is also an objective of this invention to provide a plumb bob which can be used by a single worker to transfer a point between an upper and a remotely located lower plane without anchoring the plumb bob to the upper surface.

It is likewise an objective of this invention to provide a marker mechanism in a plumb bob permitting a single worker to transfer a point between remote upper and power surfaces.

BRIEF STATEMENT OF THE INVENTION

This invention comprises a plumb bob having a segmented bob body with an upper bob body segment which is attached to a flexible suspension cord and a removably attached lower bob body segment. The upper segment of the bob body has a marker mechanism which can be an internally contained marker that is resiliently biased within the upper segment by springs which permit the marker to project from the under surface of the body upon impact, registering a point on the lower surface. An alternative marker mechanism comprises a pair of crossed slots in the lower end surface of the upper segment which guide a marker for scribing lines which intersect at the transfer point. The upper segment of the bob body is secured on the transfer point by a central protuberance which permits the body to tilt, but not topple, resting at the transfer point. A third embodiment which is useful in either of the first two embodiments comprises a removable stand attached to the plumb bob body which has a lower support member located on a plane through which the lower point of the plumb bob slightly projects, whereby the plumb bob can be rested on the transfer point in a slightly tilted orientation.

BRIEF DESCRIPTION OF THE FIGURES

The invention will be described with reference to the figures of which;

FIGS. 1 and 2 illustrate the embodiment of the invention having a segmented plumb bob body with cross slots for use with a marker;

FIGS. 3 and 4 illustrate use of the marking mechanism of the plumb bob shown in FIGS. 1 and 2;

FIG. 5 illustrates the plumb bob of the invention having a marker internally housed in the bob body upper segment;

FIG. 6 illustrates in exploded view a marker useful with the plumb bob of FIG. 5;

FIG. 7 is a prospective view of a plumb bob of the invention with the optional stand; and FIG. 8 illustrates an elevational view of the plumb bob and optional stand shown in FIG. 7.

DESCRIPTION OF PREFERRED EMBODIMENT

Referring now to FIGS. 1 and 2, there is illustrated a plumb bob body 10 which has a conventional, flexible, cord or string 12 that is attached at a central point 14 on the upper end 16 of the plumb bob 10. Various attachments can be used for this purpose such as the illustrated threaded end cap 18 having a central aperture 20 which is removably attached to an externally threaded neck on the upper end 16 of the plumb bob body 10. The plumb bob body 10 is segmented into an upper segment 22 and a lower, pointed segment 24. The segments 22 and 24 are removably engaged, and the lower segment 24 has a threaded stud 26, see FIG. 2, which is received in a central internally bore (not shown) in the upper segment 22. The plumb bob body 10 shown in FIG. 1 is of a general conventional configuration having a sufficiently massive body to provide sufficient weight to quickly stabilize, rather than oscillate or swing about a transfer point. The plumb bob body 10 has a tapered lower end, which in the illustrated embodiment is formed by the conical lower segment 24, terminating in a sharp point 28.

The plumb bob body 10 of the invention has a marker mechanism for stabilizing and positioning the upper segment resting on the lower plane by a single worker when the plumb bob body 10 is out of reach of the worker. In such applications, the worker removes the lower segment 24 and the upper segment 22 of the plumb bob body 10 is permitted to rest at the transfer point 30, as shown in FIG. 3. To provide accuracy in location of the upper segment 22 on the transfer point 30, a protuberance 32 is provided on the under surface 34 of the upper segment 22, centrally located on the central axis 36 of the plumb bob body 10. Although various forms or shapes for the protuberance 32 can be employed, I prefer to employ spherically arcuate surfaces, as shown. The marking transfer aids for the plumb bob body 10 comprises a pair of through slots 38 and 40 which are orthogonal to each other and which intersect on the central axis 36 of the plumb bob body 10. The slots 38 and 40 extend into the upper segment 22 from its under surface 34, thereby permitting a worker to insert a marker 50, as shown in FIG. 4 and scribe a pair of lines on the lower most surface which intersect at the transfer point 30. As shown in FIG. 3, the protuberance 32 extends only a slight distance from the undersurface 34 of the upper segment 22 whereby the upper segment 22 will rest and not topple when the tension on the support cord 12 is released. In this position, the upper segment tilts slightly, resting on the central protuberance 32 and the outer edge 52 of the undersurface 34 of the upper segment 22.

Referring to FIGS. 5 and 6, an alternative of the invention will be described. As there illustrated, the plumb bob body 54 has a convention flexible cord 12 which is attached to the upper edge of the plumb bob body 10, again with a threaded cap 18 having a central aperture 20 through which the support cord 12 extends. The cap 18 is threaded on the upper end of the bob body 54 and, for this purpose, see FIG. 6, has an externally threaded stud 56 which is engaged in a threaded bore 58 of the upper segment 60 of the bob body 54.

The plumb bob body 54 has two segments which include the main or upper segment 60 and a pointed-end, lower segment 62 which is removably attached to the upper segment 60 with a threaded engagement comprising an externally threaded cylindrical well 64 in the upper end 66 of the pointed-end, lower segment 62 which is removable received on a threaded end 68 of the upper segment 60.

The upper segment 60 has an internal cavity (not shown) which receives a weighted marker. The marker 70 is shown in exploded view in FIG. 6 and comprises a generally cylindrical body 72 which is hollow in form and which has a threadably engaged upper cap 74, thereby providing an ink reservoir within the marker 70. The lower end 76 of the marker 70 has a centrally located pen 78 terminating in a marker pen point 80 which can be of various construction but which is preferably a felt tip marker. The marker 70 is housed within the plumb bob upper segment 60 and is resiliently captured within the segment 60 by a pair of compression springs 90 and 92 positioned, one each at opposite ends of the marker body 72. The lowermost spring 90 is captured between an internal shoulder of the central cavity of the upper segment and the lower shoulder 94 of the marker 70. This spring has sufficient bias to overcome the weight of the marker 70 and retain the felt point of the marker retracted within the upper segment 60. Upon impact, however, the momentum of the marker 70 is sufficient to overcome the resilient bias of the lower spring 90, ejecting the felt tip point 80 from the upper segment 60 and transferring a mark at the desired transfer point on the lower surface.

Referring now to FIGS. 7 and 8, there is illustrated an accessory stand 96 that can be optionally used with the plumb bobs of the invention. The accessory stand 96 has an uppermost ring 98 which is removably received in a circumferential groove 100 about the plumb bob body 10 thereby forming an assembly of the stand 96 and plumb bob body 10. The stand 96 has a lower support which, in the illustrated embodiment, is a lower ring 102 of substantially greater diameter than the upper ring 98 and which is secured thereto by three legs 104, 106 and 108 which are disposed at equal spacings about the circumference of the stand 96. The lower ring 102 is located by the legs 104–108 in a plane which is adjacent but slightly above the pointed end 28 of the plumb bob body 10 whereby the pointed end projects through the plane of the lower ring 102. As shown in FIG. 8 this permits the plumb bob body 10 to be rested in a tilted or canted orientation on the transfer point 30, thereby permitting the worker to release the tension on the support cord 12 without toppling of the plumb bob body 10, and losing the transfer point on the lower surface.

The plumb bob of the invention can be used as a conventional plumb bob, or can be used by a single worker utilizing the advantages of the invention. In such applications, the lower segment of the bob body of the embodiments shown in FIGS. 1–5 is removed, and the worker holds the plumb bob by the cord 12 from the point on the upper surface. The worker permits the bob to cease movement, and then gently jiggles the cord 12, causing the bob to tap the floor, centering the bob at the transfer point on the lower surface. With the embodiment of FIGS. 1–4, the worker releases the tension on the cord to permit the upper segment of the body to rest on the transfer point, which is then scribed onto the lower surface.

With the embodiment of FIGS. 5 and 6, the worker then slowly raises and drops the bob a short distance, which is sufficient to jar the end of the marker against the lower surface, transferring the point.

With the embodiment shown in FIGS. 6 and 7, the upper and lower segments are not detached, but the worker attaches the stand, and uses the bob in the same manner as described for the embodiment of FIGS. 1–4.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. In a plumb bob having a body with a flexible cord attached to the upper end of the body by attachment means, and a tapered lower end terminating in a sharp point, with said attachment means and said flexible cord and a sharp point being located on a central axis passing through the center of gravity of said bob body, the improvement comprising:
   a. a segmented bob body having at least two removably attached bob body segments consisting of:
      (1) a bob body upper segment having said flexible cord attachment means, and
      (2) a bob body lowermost segment including said tapered lower end removably attached to said upper body segment; and
   b. center point registration means located on the undersurface of said upper body segment including a raised protuberance centrally located on the undersurface of said bob body upper sediment to permit said bob body upper segment to tilt, but not topple, on said central axis when rested on a supporting surface, whereby
   a single worker can position the upper end of said flexible cord at a point on an elevated surface and transfer the location of said point to a remote lower surface without securing said flexible cord to said elevated surface.

2. The plumb bob of claim 1 wherein said plumb bob body segments are threadably attached together.

3. The plumb bob of claim 1 including cross slots in said bob body upper segment extending to the undersurface thereof, whereby a worker can insert a marker in said cross slots and thereby transfer said point to said lower surface as a pair of lines intersecting at the location of said point.

4. The plumb bob of claim 3 wherein said bob body lowermost segment has a threaded stud extending along said central axis which is received in an aligned, internally threaded bore in said bob body upper segment.

5. A plumb bob having a body with a flexible cord attached to the upper end of the body by attachment means, and a tapered lower end terminating in a sharp point, with said attachment means and said flexible cord and said sharp point being located on a central axis passing through the center of gravity of said bob body, the improvement comprising:
   c. a segmented bob body having at least two removably attached bob body segments consisting of:
      (1) a bob body upper segment having said flexible cord attachment means, and (2) a bob body lowermost segment including said tapered lower end removably attached to said upper body segment; and d. center point registration means comprising a marker having a marker point that projects from the undersurface thereon on said central axis and received in a cavity within said bob body upper segment and supported therein by resilient means biasing said marker point entirely within said segment, whereby a single worker upon removal of said lowermost bob body segment, can position the upper end of said flexible cord at a point on an elevated surface and transfer the location of said point to a remote lower surface without securing said flexible cord to said elevated surface.

6. The plumb bob of claim 5 wherein said marker has a weighted body of sufficient mass to overcome the biasing force of said spring means and project said marker point from said upper segment by impacting said upper segment against said lower surface.

7. The plumb bob of claim 5 wherein said marker comprises a cylindrical marker body having an ink well with a felt point marker.

8. In a plumb bob having a body with a flexible cord attached to the upper end of the body by attachment means, and a tapered lower end terminating in a sharp point, with said attachment means and said flexible cord and said sharp point being located on a central axis passing through the center of gravity of said bob body, the improvement comprising:

a. a circumferential groove about said plumb bob body; and b. a plumb bob stand having an uppermost ring which is removably received within said circumferential groove and a lowermost support with spacers extending between said uppermost ring and lowermost support to locate said lowermost support on a plane which is penetrated by said pointed end of said plumb bob, whereby a single worker can position the upper end of said flexible cord at a point on an elevated surface and transfer the location of said point to a remote lower surface without securing said flexible cord to said elevated surface, and said plumb bob upon placement at said point on said lower surface will tilt but not topple from said point.

9. The plumb bob of claim 8 wherein said plumb bob stand is a pod with at least three legs spaced at equal circumferential spacings.

10. The plumb bob of claim 8 wherein said lowermost support is a second ring of greater diameter than said uppermost ring.

11. The plumb bob of claim 8 having a segmented bob body comprising at least two bob body segments consisting of a bob body upper segment having said flexible cord attachment means, and a bob body lowermost segment including said tapered lower end and said circumferential groove and being removably attached to said upper body segment.

* * * * *

UNITED STATES PATENT AND TRADEMARK OFFICE
CERTIFICATE OF CORRECTION

PATENT NO. : 5,621,977
DATED : April 22, 1997
INVENTOR(S) : Kenneth J. Hampton

It is certified that error appears in the above-indentified patent and that said Letters Patent is hereby corrected as shown below:

column 4, line 39, change "sediment" to --segment--

Signed and Sealed this

First Day of July, 1997

Attest:

BRUCE LEHMAN

Attesting Officer      Commissioner of Patents and Trademarks